United States Patent
Atmopawiro et al.

(10) Patent No.: US 11,212,111 B2
(45) Date of Patent: *Dec. 28, 2021

(54) METHOD FOR SYNCHRONIZED SIGNATURE WITH ADDITIVE RSA KEY SPLITTING USING A SLIDING WINDOW

(71) Applicant: THALES DIS FRANCE SA, Meudon (FR)

(72) Inventors: Alsasian Atmopawiro, Meudon (FR); Thi Tra Giang Dang, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 188 days.

This patent is subject to a terminal disclaimer.

(21) Appl. No.: 16/469,301

(22) PCT Filed: Dec. 12, 2017

(86) PCT No.: PCT/EP2017/082421
§ 371 (c)(1),
(2) Date: Jun. 13, 2019

(87) PCT Pub. No.: WO2018/108907
PCT Pub. Date: Jun. 21, 2018

(65) Prior Publication Data
US 2020/0036534 A1  Jan. 30, 2020

(30) Foreign Application Priority Data
Dec. 15, 2016 (EP) .................................... 16204274

(51) Int. Cl.
*H04L 9/32* (2006.01)
*H04L 9/12* (2006.01)
*H04L 9/30* (2006.01)

(52) U.S. Cl.
CPC .............. *H04L 9/3249* (2013.01); *H04L 9/12* (2013.01); *H04L 9/302* (2013.01); *H04L 2209/46* (2013.01)

(58) Field of Classification Search
CPC ... H04L 29/06; H04L 9/30; H04L 9/32; H04L 9/12; H04L 9/3249; H04L 9/302; H04L 9/3271; H04L 9/3263; G06F 12/14
See application file for complete search history.

(56) References Cited

U.S. PATENT DOCUMENTS

| 6,381,699 B2 * | 4/2002 | Kocher | .................. G06F 7/723 705/65 |
| 6,539,092 B1 * | 3/2003 | Kocher | ............... G06Q 20/341 380/252 |

(Continued)

OTHER PUBLICATIONS

PCT/EP2017/082421, International Search Report, dated Mar. 5, 2018, European Patent Office, P.B. 5818 Patentlaan 2 NL—2280 HV Rijswijk.

(Continued)

*Primary Examiner* — Thanhnga B Truong
(74) *Attorney, Agent, or Firm* — The Jansson Firm; Pehr B. Jansson (57) ABSTRACT

The present invention relates to a method of secure generation by a client device and a server device of an RSA signature of a message to be signed with a private exponent component d of an RSA key (p, q, N, d, e), wherein said client device stores a client device private exponent component dA, a client value, and a client dynamic offset, and said server device stores a server device private exponent component dB, where dB=d−dA modulo phi(N), a server value, a server dynamic offset and a failure counter, comprising: a. receiving from the client device a client part of said RSA signature (HS1) of said message to be signed, after incrementing its client value (pvA) by a first predetermined (Continued)

step E, from the client device private exponent component and from an updated client dynamic offset function of said client dynamic offset and of said client value, b. setting said failure counter to a first default value, c. incrementing said server value (pvB) by a second predetermined step (E'), d. generating a server part of said RSA signature (HS2) of said message to be signed, from the server device private exponent component and from an updated server dynamic offset function of said server dynamic offset and of said server value, e. generating said RSA signature by combining said client part of said RSA signature (HS1) and said server part of said RSA signature (HS2), f. checking if the generation of the RSA signature was a failure and when it was a failure, incrementing said failure counter and g\ iteratively repeating above steps c\ to f\, until said RSA signature is successfully generated or said failure counter reaches a first predetermined threshold S.

14 Claims, 3 Drawing Sheets

(56) References Cited

U.S. PATENT DOCUMENTS

| | | | |
|---|---|---|---|
| 8,831,214 B2* | 9/2014 | Shaik | H04L 9/302 |
| | | | 380/44 |
| 9,501,429 B2* | 11/2016 | Zheng | H04N 21/4431 |
| 2007/0081667 A1* | 4/2007 | Hwang | H04L 9/3226 |
| | | | 380/30 |

OTHER PUBLICATIONS

PCT/EP2017/082421, Written Opinion of the International Searching Authority, dated Mar. 5, 2018, European Patent Office, D-80298 Munich, Germany.

Blakiewicz et al: "Signatures for e-Government Digital Signatures for e-Government—a Long-Term Security Architecture", , (Nov. 11, 2010), XP055376941, Retrieved from the Internet: URL:http://kutylowski.im.pwr.wroc.pl/articles/E-Forensics2010-presentation.pdf [retrieved on May 30, 2017] cited in the application the whole document.

Mihir Bellare et al: "The Security of Practical Two-Party RSA Signature Schemes", International Association for Cryptologic Research,, vol. 20020610:021238, (Jun. 10, 2002), pp. 1-26, XP061000234, cited in the application p. 8-p. 20.

Gene Tsudik: "Weak Forward Security in Mediated RSA", Security in Communication Networks. Third International Conference, SCN 2002, Sep. 11-13, 2002, Sep. 1, 2002, pp. 45-54, XP055305389, DOI: 10.1007/3-540-36413-7_4 ISBN: 978-3-540-00420-2 Retrieved from the Internet: URL:http://www.ics.uci.edu/'gts/paps/t02.pdf [retrieved on Sep. 26, 2016] the whole document.

* cited by examiner

METHOD FOR SYNCHRONIZED SIGNATURE WITH ADDITIVE RSA KEY SPLITTING USING A SLIDING WINDOW

FIELD OF THE INVENTION

The present invention relates to the field of signature generation by secure multi party computation (SMC) using additive RSA key splitting with floating exponent, and more particularly to a server device allowing to maintain synchronization between a client device and the server device while preventing device cloning attacks.

BACKGROUND OF THE INVENTION

In order to provide a proof that it is the author of a given message, any client device can implement an existing signature process such as RSA to sign said message using a private key.

Many existing client devices only offer a low security level. An attacker could therefore retrieve the private key of the client device by a brute-force attack on key storage, then enabling him to forge signatures on behalf of the client device.

In order to prevent such attacks, secure multi party computation (SMC) signing processes have been proposed in which different parties, such as a client and a server, possess their own key parts and must cooperate to produce a valid signature. As a result, an attacker retrieving the key part of one party is not able to forge a valid signature. SMC processes have been proposed for RSA signature scheme, such additive key splitting ("Instantaneous revocation of security capabilities", D. Boneh, X. Ding and G. Tsudik, Usenix 2001) in which the RSA key is the sum of the RSA key parts hold by the parties, and multiplicative splitting ("The security of practical two-party RSA signature schemes", M. Bellare and R. Sandhu, eprint IACR 2001) in which the RSA key is the product of the RSA key parts hold by the parties.

Such SMC signature processes are subject to device cloning attack. In such attacks, an attacker holding a clone of a client device can interact with a server device in order to perform such a SMC signature process and obtain a valid signature of a message as if the original client device had been in interaction with the server device.

In order to prevent such attacks, the exponent floating technique has been proposed, in which each party key part is refreshed at each transaction, using a dynamic offset which is updated after each transaction. Then a client device and a server device can successfully interact for generating a signature only if both use the same dynamic offset. Using such a technique, if both a valid client device and a clone client device try to interact with the same server, the offset of the server and the offsets of the clients won't match anymore and the server can detect the clone client device as an illegitimate device ("Digital signatures for e-government—a long term security architecture", P. Blaskiewicz, P. Kubiak and M. Kutylowski, Forensics 2000).

The floating exponent has the major drawback of being sensitive to device desynchronization. If the client device and the server device get desynchronized, for example because of network issues during a signature process leading to increment the dynamic offset on the server side but not on the client side, their dynamic offsets won't be equal anymore and they won't be able anymore to interact for producing a signature.

Consequently, there is a need for a SMC signature process based on RSA scheme, protected against device cloning attacks using the floating exponent technique and enabling to maintain client and server synchronization while remaining secure against device cloning attacks.

SUMMARY OF THE INVENTION

For this purpose and according to a first aspect, this invention therefore relates to a method of secure generation by a client device and a server device of an RSA signature of a message to be signed with a private exponent component d of an RSA key (p, q, N, d, e), where e is a public exponent component, N is a RSA modulus, p, q primes such $N = p \cdot q$ and $e \cdot d = 1$ modulo phi(N) with phi(N) Euler's function, wherein said client device stores a client device private key equal to (N, dA) with dA a client device private exponent component, a client value, and a client dynamic offset, and wherein said server device stores a server device private key equal to (N, dB) with dB a server device private exponent component, where $dB = d - dA$ modulo phi(N), a server value, a server dynamic offset and a failure counter, said method comprising the following steps performed by the server device:

a. receiving from the client device a client part of said RSA signature of said message to be signed generated by the client device, after incrementing its client value by a first predetermined step, from the client device private exponent component, and from an updated client dynamic offset, said updated client dynamic offset being function of said client dynamic offset and of a client shift value, said client shift value being function of said client value, b. setting said failure counter to a first default value, c. incrementing said server value by a second predetermined step, d. generating a server part of said RSA signature of said message to be signed, from the server device private exponent component, and from an updated server dynamic offset, said updated server dynamic offset being function of said server dynamic offset and of a server shift value, said server shift value being function of said server value, e. generating said RSA signature by combining said client part of said RSA signature and said server part of said RSA signature, f. checking if the generation of the RSA signature was a failure or a success and when it was a failure, incrementing said failure counter, g. when the generation of the RSA signature was a failure, iteratively repeating above steps c\ to f\, until said RSA signature of said message to be signed is successfully generated or said failure counter reaches a first predetermined threshold.

Such a method enables to recover synchronization between the client device and the server device when their desynchronization is lower than the maximum tolerance of the server device to desynchronization, while protecting against device cloning attacks by suspending the signature generation for larger desynchronization.

The server device may store a ratification counter and a server initial value, said client device private key being protected by a client password, said client part of said RSA signature being generated by the client device after a user of the client device provided a password value and step a\ may comprise setting said server initial value equal to said server value, step g\ may comprise when the generation of the RSA signature was a success, setting said ratification counter to a second default value, step g\ may comprise when said failure counter reaches said first predetermined threshold, setting said server value equal to said server initial value, incrementing said server value by said second predetermined step and incrementing said ratification counter, and said method may comprise the following step:

h. when said failure counter reaches said first predetermined threshold, iteratively repeating above steps a\ to g\ until said RSA signature of said message to be signed M is successfully generated or said ratification counter reaches a second predetermined threshold.

Protecting the client private key enables to avoid that an attacker having access to the memory of the client device may forge a valid client part of an RSA signature. It also has the consequence that the signature process may fail because the user of the client device entered a wrong password. In such a case, such additional features in steps a, g and h enable to allow the user of the client device multiple tries on the password before interrupting the signature generation process.

The client device private exponent component dA or the server device private exponent component dB may be a random integer in ]0; phi(N)[.

Said client shift value may be generated by a pseudo random number generator from a secret value preshared between the client device and the server device and from the client value, and said server shift value may be generated by a pseudo random number generator from said secret value and from the server value.

By doing so, the client shift value and the server shift value may remain identical, enabling the client device and the server device to successfully interact for producing a signature using SMC RSA splitting with floating exponent. In the same time the client shift value can't be guessed by an attacker unless he has knowledge of both the secret value and the current client value.

Said updated client dynamic offset may be equal to the sum of the client dynamic offset and the client shift value, and said updated server dynamic offset may be equal to the sum of the server dynamic offset and the server shift value.

Said client part of the current RSA signature may be generated by the client device using as signing key the sum of the client device private exponent component and the updated client dynamic offset.

Said server part of the current RSA signature may be generated by the server device using as signing key the result of subtracting the updated server dynamic offset from the server device private exponent component.

Said client part of the current RSA signature may be generated by the client device using as signing key the result of subtracting the updated client dynamic offset from the client device private exponent component and said server part of the current RSA signature may be generated by the server device using as signing key the sum of the updated server dynamic offset and the server device private exponent component.

Using such dynamic offsets and such signing keys enable to combine both parts of the current RSA signature such that both dynamic offsets cancel each other.

The client part of the current RSA signature HS1 of a message to be signed M may be equal to $H(m)^{dA+hA'} \mod n$, the server part of the current RSA signature HS2 of said message to be signed M may be equal to $H(M)^{dB-hB'} \mod n$, and the current RSA signature of said message to be signed M may be equal to HS1*HS2 mod n, with H(M) a hashing of said message to be signed M.

In a first embodiment, said first predetermined step and said second predetermined step are equal positive values.

It enables the server device, when trying to recover synchronization with the client device to move forward its server value pvB in order to try to catch up with the client value pvA.

In a second embodiment, said first predetermined step is a positive value, said second predetermined step is equal to said first predetermined step at the first execution of step c and said second predetermined step is the opposite of said first predetermined step at subsequent executions of step c during step g.

It enables the server device, when trying to recover synchronization with the client device to move backward its server value pvB in order to make it equal to the client value pvA.

The method according to the first aspect may comprise: receiving a PIN from the client device in order to authenticate a user of the client device and:
  when said PIN is correct, increasing said first predetermined threshold,
  when said PIN is incorrect, suspending said performing said method.

It enables to resynchronize the client device and the server device in case of desynchronization larger than the maximum tolerance of the server.

According to a second aspect, this invention therefore relates also to a computer program product directly loadable into the memory of at least one computer, comprising software code instructions for performing by a computer's processor the steps of the method according to the first aspect when said product is run on the computer.

According to a third aspect, this invention therefore relates also to a server comprising a processor and an interface configured to perform the steps of the method according to the first aspect, a memory configured to store said server device private key, said server value, and said server dynamic offset.

According to a fourth aspect, this invention therefore relates also to a system comprising a server according to the third aspect and a client device.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention relates to a method of secure generation of a RSA signature involving a secure multi party computation during which a client device A and a server device B must cooperate for generating said signature.

Figure 1:
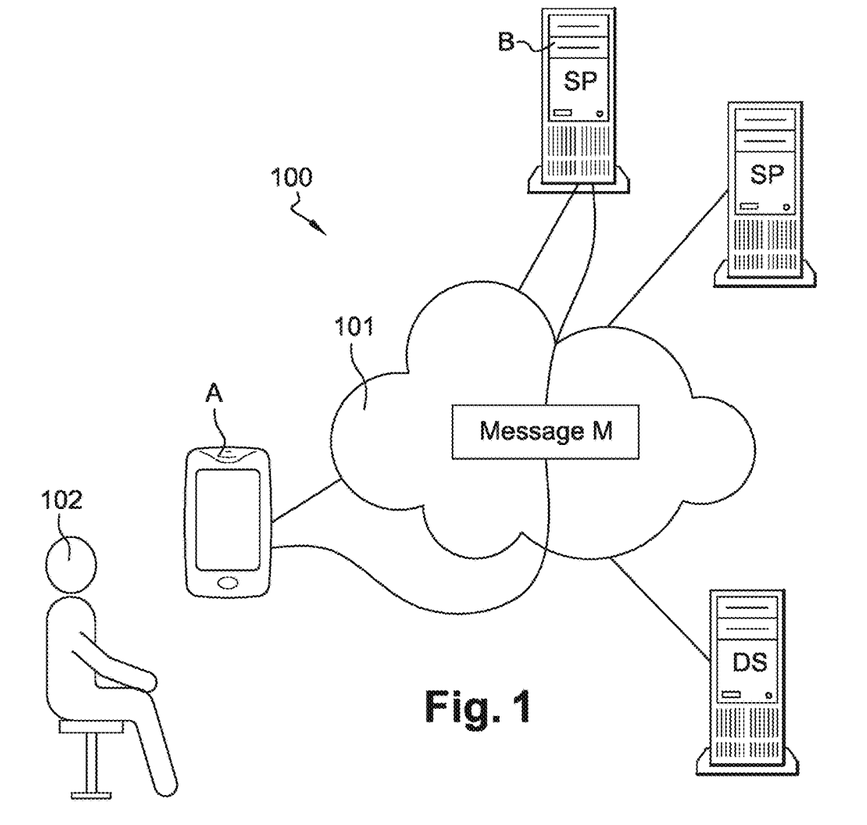
FIG. 1 is a schematic illustration of a system comprising a client device A and one or more remote server devices B according to an embodiment of the present invention.

FIG. 1 is a schematic illustration of a network 101 connecting a client device A to a server device B. The client device A is operated by a user 102 and interacts with the server device B.

Such a configuration should not be interpreted as a limitation of the invention and an alternate embodiment of the invention could involve a secure multi party computation between the client device and more than one server device.

The client device A may be any electronic device including a processor. For example it may be a personal computer PC, a mobile device such as a smartphone or a tablet, or a public terminal in a bank or a point of sale. It may also be a simple chip included in a smart card or a credit card. The server device B is preferably a computer but it could also be any other electronic device including processing means.

Figure 2:
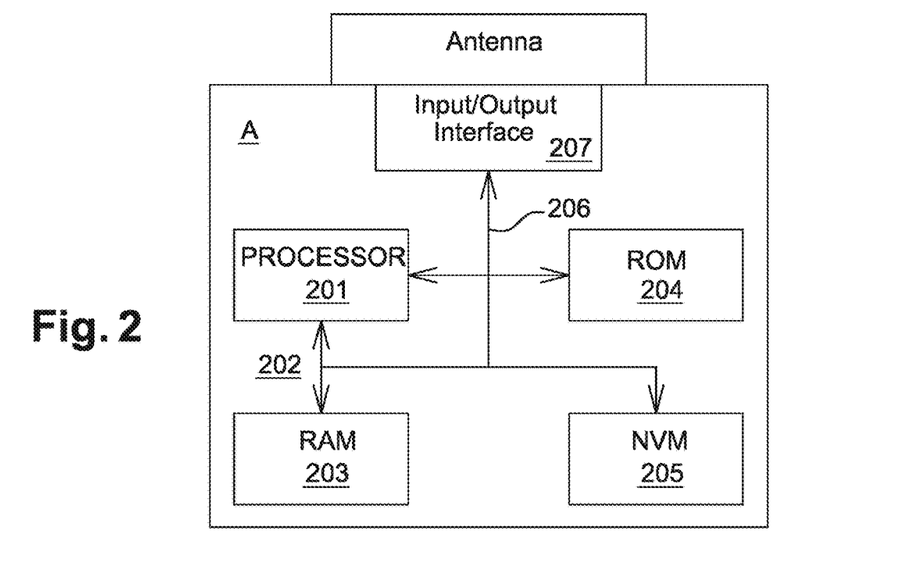
FIG. 2 is a schematic illustration of a client device A according to an embodiment of the present invention.

FIG. 2 is a schematic illustration of a client device A, for example, a mobile telephone, tablet, or personal computer. The client device A may include a processor 201 connected via a bus 202 to a random access memory (RAM) 203, a read-only memory (ROM) 204, and/or a non-volatile memory (NVM) 205. The client device A further includes a connector 206 connected to the processor and by which the client device A may be connected to an antenna. Such an antenna may be used to connect the client device A to various forms of wireless networks such as the network 101, e.g., wide-area networks, WiFi networks, or mobile telephony networks. Alternatively, the client device may connect to networks via wired network connections such as Ethernet.

Figure 3A:
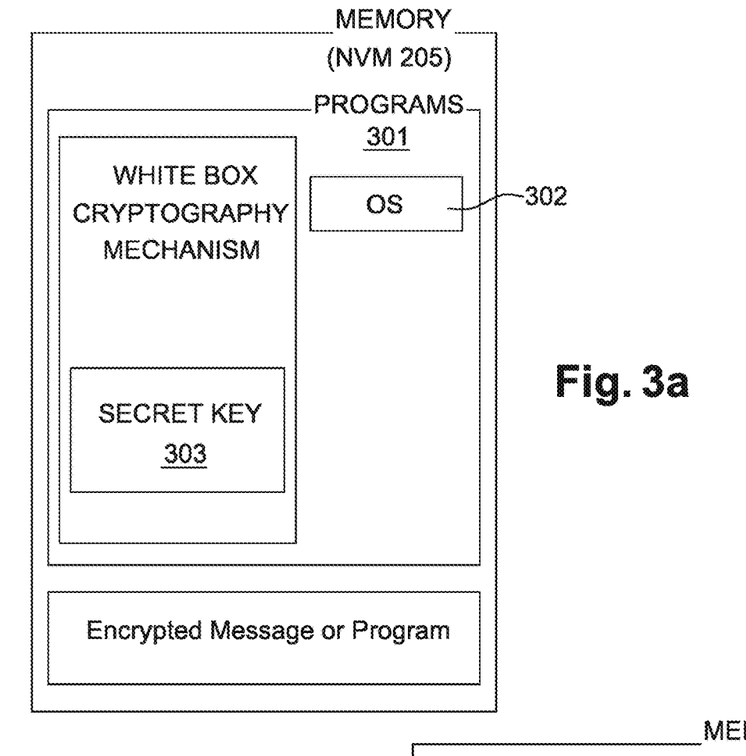
FIGS. 3a and 3b are schematic illustrations of programs and data stored in a memory of the client device of FIG. 2.
Figure 3B:
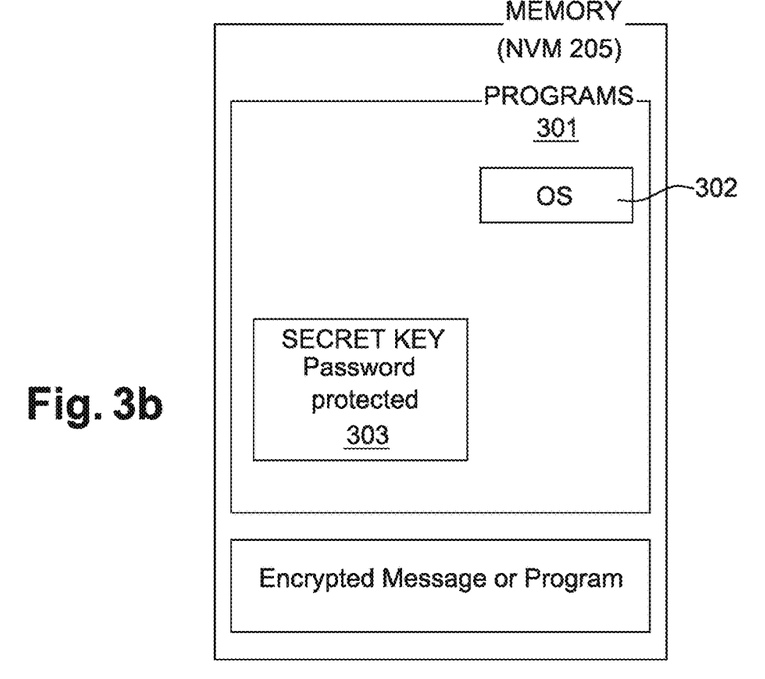

The ROM 204 and/or NVM 205 may include computer programs 301 as is illustrated in FIGS. 3a and 3b. While it is here depicted that the computer programs 301 are all co-located in the ROM 204 or the NVM 205, in actual practice there is no such restriction as programs may be spread out over multiple memories and even temporarily installed in RAM 203. The programs 301 include operating system programs 302 as well as application programs loaded onto the client device. The client device may also include input/output means 207 providing interfaces to the user of the client device, such as one or more screens, loudspeakers, a mouse, tactile surfaces, a keyboard etc.

Figure 4:
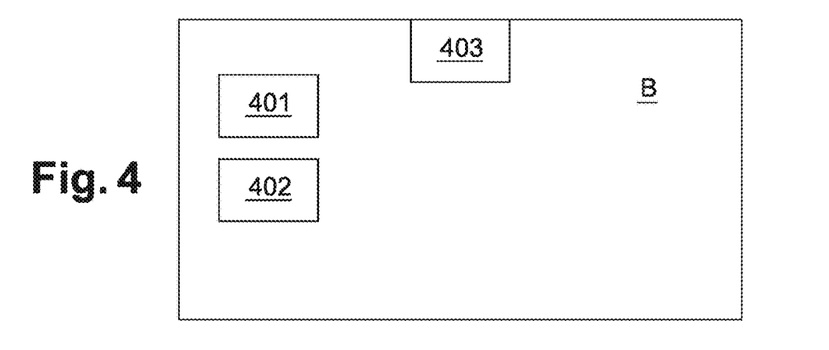
FIG. 4 illustrates schematically a server device B according to an embodiment of the present invention.

As illustrated in the FIG. 4, the server B includes at least a processor 401 for performing the operations needed for generating a signature, a memory 402 such as a RAM, a ROM and/or a NVM, and a wired or wireless network interface 403 for connecting to the network 101 and exchanging messages at least with the client device.

The invention aims at securely generating a signature of a message to be signed M with a RSA key (p, q, N, d, e), where d is a private exponent component, e is a public exponent component, N is a RSA modulus, p, q primes such $N=p \cdot q$, and $e \cdot d=1$ modulo phi(N) with phi(N) Euler's function.

In order to generate such a signature through a secure multi party computation SMC, the RSA key is broken into a client device private key and a server device private key. The client device A stores a client device private key equal to (N, dA) with dA a client device private exponent component. The server device B stores a server device private key equal to (N, dB) with dB a server device private exponent component.

As depicted on FIG. 3a, a sub-part of the memory, ROM and/or NVM, of the client device may securely store sensitive data 303 such as the client device private key (N, dA). Alternatively, as depicted on FIG. 3b, sensitive data such as the client device private key may be stored in the same part of the memory than less sensitive data but sensitive data may be password protected by a client password. Alternatively, the client device private key may be stored remotely, in an online data storage vault for example. Such data may be stored under an encrypted format. Similarly the server device private key (N, dB) may be stored in a secured area of the server memory or on a remote server, possibly under an encrypted format.

The embodiment described here under makes use of an additive splitting of the RSA secret key. In such a case, the client device private key (N, dA) and the server device private key (N, dB) are such that dB=d−dA modulo phi(N). Either the client device private exponent component dA or the server device private exponent component dB may be a random integer drawn in ]0; phi(N)[. Such a drawing may be performed by the server device or by a trusted keysplit server connected to the client device and the server device. When the client device private exponent component dA is randomly drawn, the server device private exponent component dB is such that dB=d−dA modulo phi(N). Alternatively when the server device private exponent component dB is randomly drawn, the client device private exponent component dA is such that dA=d−dB modulo phi(N).

In order to protect the signature process against device cloning attacks, the method implements the floating exponent technique. In order to do so, the client device stores a client dynamic offset hA and the server device stores a server dynamic offset hB. Then, at each signature generation, both offsets are updated and each device generates a part of the signature using as signature key its private exponent component dA or dB and the updated dynamic offset.

As explained here above, such a technique prevents an attacker unaware of the correct offset value to be used from successfully interacting with the server device for producing a signature. But it is also sensitive to desynchronization: if one device updates its offset and the other one does not, offsets get desynchronized and the signature process cannot be successfully performed anymore.

In such a context, the invention aims at maintaining client and server synchronization while remaining secure against device cloning attacks.

In order to do so, the client device stores a client value pvA and the server device stores a server value pvB. For generating a signature of a message to be signed M, each device increments is client/server value and then updates its dynamic offset based on its incremented client value pvA or server value pvB.

In case of desynchronization of the client device and the server device, for example because of a network failure, one device may increment its client or server value, possibly several times, while the other device does not increment its own client or sever value. In that case, dynamic offsets of the client device and the server device are not equal anymore; the client device and the server device cannot interact anymore to successfully produce a signature.

In order to cope with such a desynchronization, the method includes a mechanism called "sliding window" allowing the server device, when interacting with the client device and failing generate a valid signature, to increment or decrement repeatedly its server value pvB in order to test next or previous values of the server dynamic offset hB until a valid signature is generated. By doing so, the client device and the server device can be synchronized again.

In order to keep a low sensitivity to device cloning attacks the number of times the server device is allowed to increment its server value pvB while attempting to generate a single signature shall be limited. Such a maximum number of retries can be called the size of sliding window and represents the maximum tolerance of the server to desynchronization. Any larger desynchronization shall be considered as a consequence of a device cloning attack. The server device may store a failure counter used to count a number of successive failed attempts of generating a signature for a given message.

Figure 5:
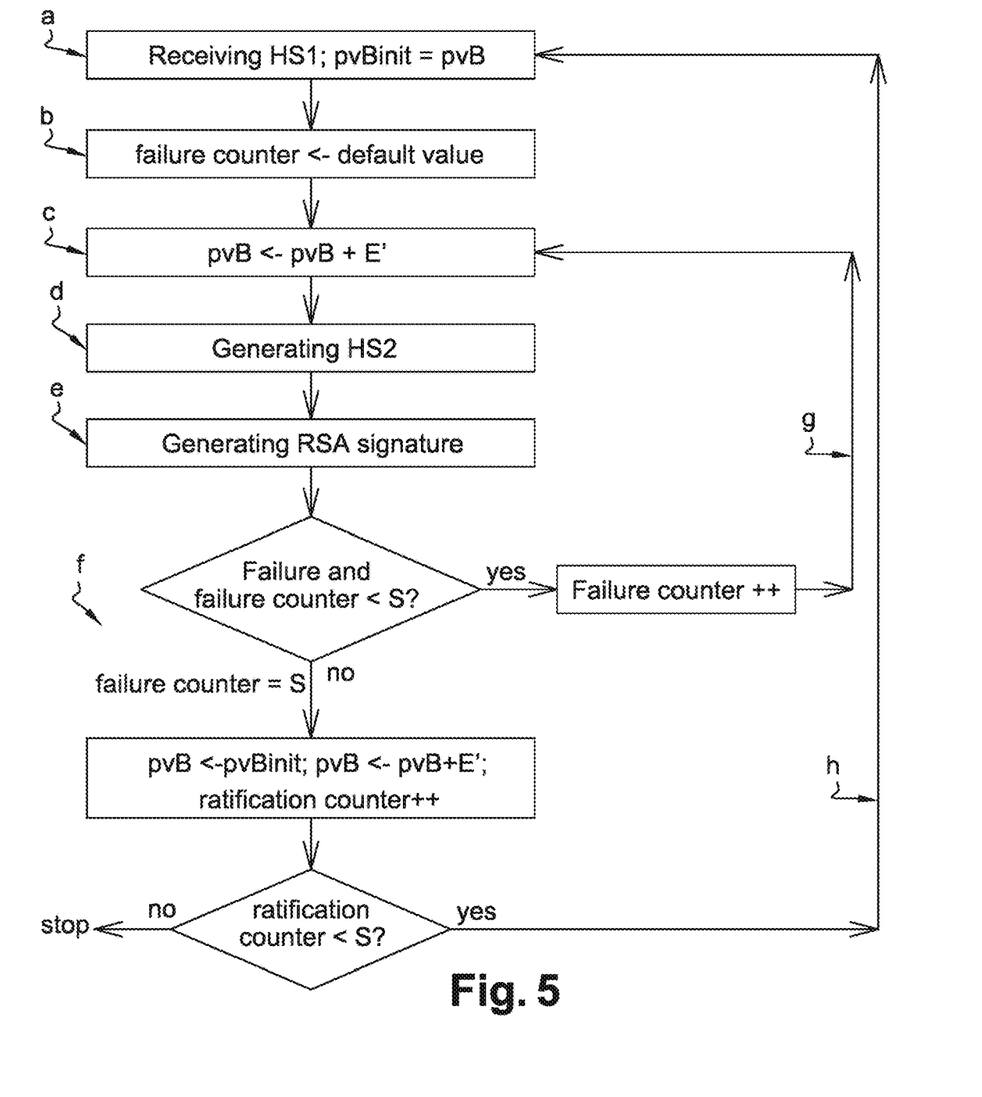
FIG. 5 illustrates schematically a method of generating a current RSA signature and a next RSA signature according to an embodiment of the present invention.

The following paragraphs describe the steps of a method generating a signature performed by the server device B according to a first aspect of the invention as depicted on FIG. 5.

In a first reception step a, the server device may receive from the client device a client part of said RSA signature HS1 of said message to be signed M. The client device may have generated said client part of said RSA signature HS1, after incrementing its client value pvA by a first predetermined step E, from the client device private exponent component dA and from an updated client dynamic offset hA', said updated client dynamic offset hA' being function of the client dynamic offset hA and of a client shift value cA, said client shift value cA being function of the client value pvA.

In an embodiment, when the client device secret key is password protected, the user of the client device may have to provide a password value before the client device generates the client part of said RSA signature HS1. In that case, the client device may generate a client part of said RSA signature HS1 whatever the password value provided by the user but the client part of said RSA signature HS1 will be valid, ie usable to produce the full RSA signature, only if the user provided the right password value.

In an embodiment the client part of the current RSA signature HS1 may be generated by the client device A using as signing key the sum of the client device private exponent component dA and the updated client dynamic offset hA'. In an embodiment $HS1 = H(M)^{dA+hA'} \mod n$ with $H(M)$ a hashing of said message to be signed M.

In an embodiment, the updated client dynamic offset hA' is equal to the sum of the client dynamic offset hA and the client shift value cA: hA'=hA+cA.

In an embodiment the client shift value cA is generated by a pseudo random number generator from a secret value seed_offset preshared between the client device A and the server device B and from the client value pvA: cA=PRNG (seed_offset, pvA).

Then in an initialization step b, the client device may set said failure counter to a first default value, for example zero.

In an increment step c, the server device may increment its server value pvB by a second predetermined step E'. In an embodiment said first predetermined step E and said second predetermined step E' are equal positive values, for example positive integer values such as one. As long as the server value pvB is incremented each time the client value pvA is incremented, and both values are incremented by the same step value, the client device and the server device remain synchronized.

In a first generation step d, the server device generates a server part of said RSA signature HS2 of said message to be signed M, from the server device private exponent component dB, and from an updated server dynamic offset hB', said updated server dynamic offset hB' being function of said server dynamic offset hB and of a server shift value cB, said server shift value cB being function of said server value pvB.

In an embodiment the server part of the current RSA signature HS2 is generated by the server device B using as signing key the result of subtracting the updated server dynamic offset hB' from the server device private exponent component dB. In an embodiment $HS2 = H(M)^{dB-hB'} \mod n$.

Alternatively, the client part of the current RSA signature HS1 may be generated by the client device A using as signing key the result of subtracting the updated client dynamic offset hA' from the client device private exponent component dA and said server part of the current RSA signature HS2 may be generated by the server device B using as signing key the sum of the updated server dynamic offset hB' and the server device private exponent component dB.

In an embodiment, the updated server dynamic offset hB' is equal to the sum of the current server dynamic offset hB and the server shift value cB: hB'=hB+cB.

In an embodiment the server shift value cB is generated by a pseudo random number generator from the secret value called seed_offset preshared between the client device A and the server device B and from the server value pvB: cB=PRNG(seed_offset, pvB).

In an alternate embodiment different paddings schemes may be used when generating the client part and the server part of said RSA signature, such as the padding disclosed in PKCS#1_v1.5, PSS padding disclosed in PKCS#1v2.1 RFC 3447, and the padding disclosed in PKCS#7 RFC2315. In such a case $HS1 = H(EM)^{dA+hA'} \mod n$ and $HS2 = H(EM)^{dB-hB'} \mod n$ with H(EM) a hashing of the result of encoding said message to be signed M with the chosen padding scheme.

By doing so, provided that the client device and the server device are synchronized i.e. that the client value pvA and the server value pvB are equal, the RSA signature may then be generated by combining said client part of the RSA signature HS1 and said server part of the RSA signature HS2. In an embodiment the RSA signature of said message to be signed M is equal to HS1*HS2 mod n.

Indeed, if the client value pvA and the server value pvB are equal, the client shift value cA and the server shift value cB are identical and the updated dynamic offsets of the client hA' and of the server hB' cancel each other. HS1*HS2 is then equal to the RSA signature of message M with the private exponent component d of the shared RSA key.

In a second generation step e, the server then tries to generate said RSA signature by combining said client part of said RSA signature HS1 and said server part of said RSA signature HS2. In case the client device and the server device have been desynchronized, for example because of a network failure, the client part of said RSA signature HS1 and the server part of said RSA signature HS2 have not been produced using the same updated dynamic offsets. In that case they can't be combined so that both offsets cancel each other; and the RSA signature generation fails.

Then in a checking step f, the server device checks if the generation of the RSA signature was a failure or a success. When the server device determines it was a failure, it can be deduced that the client device and the server device may be not synchronized. In that case the server device increments its failure counter.

Then in a synchronization recovery step g, when the generation of the RSA signature was a failure, the server device tries to recover synchronization between the client device and the server device. In order to do so, the server device repeats steps c to f, i.e. the increment step c, the first generation step d, the second generation step e and the checking step f.

By doing so the server device increments again its server value pvB, regenerates accordingly a shift server value cB, an updated dynamic offset hB', and a server part of said RSA signature HS2 and ultimately tries again to generate the RSA signature of the message to be signed M.

In the synchronization recovery step g, steps c to f can be repeated iteratively until either said RSA signature of said message to be signed M is successfully generated or said failure counter reaches a first predetermined threshold S.

In one embodiment the second predetermined step E' by which the server device increments its server value pvB remains equal to the first predetermined step E, for example to one. In that case, when incrementing repeatedly its server value pvB by the second predetermined step, moves forward its server value pvB in order to try to catch up with the client value pvA. Such a technique is called forward looking sliding window and is efficient against a desynchronization resulting from a situation where the client device incremented its client value pvA while the server device did not increment its server value pvB.

In an alternative embodiment, said first predetermined step E is a positive value, for example one, said second predetermined step E' is equal to said first predetermined step E at the first execution of step c and said second predetermined value E' is the opposite of said first predetermined step E, for example −1, at subsequent executions of step c during step g.

By doing so, after a first try to generate the RSA signature, when subsequently executing steps c to g and incrementing repeatedly its server value pvB by the opposite of the first predetermined step E, the server device moves backward its server value pvB in order to make it equal to the client value pvA. Such a technique is called backward looking sliding window and is efficient against a desynchronization resulting from a situation where the server device incremented its server value pvB while the client device did not increment its client value pvA.

Alternatively, both techniques can be combined into a backward and forward sliding window.

As previously said, in order to keep a low sensitivity to device cloning attacks the number of times the server device is allowed to increment its server value pvB while attempting to generate a single signature shall be limited. Such a goal is reached by stopping the signature generation process when the failure counter reaches said first predetermined threshold representing the maximum tolerance of the server to desynchronization. Any desynchronization larger than the maximum tolerance of the server is then considered as a device cloning attack and results in a suspension of the signature generation process, even if the client device is legitimate and just experienced a particularly large desynchronization.

When the client device private key is password protected the generation of the RSA signature may also fail because the user of the client device provided a wrong password value. In that case the client part of said RSA signature HS1 provided by the client device is not correct, and the generation of the RSA signature repeatedly fails in step e\ until the failure counter reaches the first predetermined threshold. Such a wrong password value may result from a mistake of the user when entering the password value. Consequently there is a need to allow the user to enter at least one time a new password value in order to correct this mistake.

In order to do so, in one embodiment:
  The server device stores a ratification counter used to remember the number of successive failed attempts to provide the correct client password. Such a ratification counter may be initialized to zero by the server device before any signature process has been performed.
  The server device stores a server initial value which may be used to store the sever value pvB at the beginning of the signature process, in order to be able to reset the server value pvB at each signature generation attempt with a new password value provided by the user of the client device.
  The first reception step a\ comprises setting said server initial value equal to said server value pvB. The server value is thus saved before it is increased, possibly multiple times, during the increment step c.
  The synchronization recovery step g\ comprises when the generation of the RSA signature was a success, setting said ratification counter to a second default value. In such a case the ratification counter can be reset, for example to zero.
  The synchronization recovery step g\ comprises when said failure counter reaches said first predetermined threshold, setting said server value equal to said server initial value, incrementing said server value by said second predetermined step and incrementing said ratification counter. In such a case, the signature generation failed for the password value provided by the user, even after trying to recover synchronization by incrementing the server value pvB. It may be the result of either a wrong password value or a desynchronization larger than the maximum tolerance of the server device. Such a failure is memorized by increasing the ratification counter. The server value is reset to its initial value in order to allow the user of the client device to try a new password value.
  The method then comprises an additional password retry step h in which, when said failure counter reaches said first predetermined threshold, steps a to g are repeated iteratively until said RSA signature of said message to be signed M is successfully generated or said ratification counter reaches a second predetermined threshold. Each time the user of the client device enters a new password value, the client device generates a new client part of said RSA signature HS1 and the server device performs steps a\ to g\ in order to try to generate a valid RSA signature for the message to be signed M. The user is allowed to retry until the ratification counter reached the second predetermined threshold. After such a number of unsuccessful retries, it can be assumed that the user did not each time made a mistake when entering his password value. Then, either the user forgot his client password or the client device and the server device are desynchronized with a larger desynchronization than the maximum tolerance of the server device. In that case the client device private key and the server device key may be revoked and replaced by new keys.

The method may also include a feature allowing to resynchronize a client device and the server device in case of desynchronization larger than this maximum tolerance of the server. In order to do so, the method may comprise receiving a PIN from the client device A in order to authenticate a user of the client device A and:

when said PIN is correct, increasing said first predetermined threshold, when said PIN is incorrect, suspending said performing said method.

The first predetermined threshold may be increased to a very large value, allowing to synchronize again the client device and the server device no matter how large the desynchronization may have been. Such a synchronization recovery is protected by an authentication of the user of the client device in order to ensure that the client device is a legitimate device and not a clone device.

In a second aspect, the invention also relates to a computer program product directly loadable into the memory of at least one computer, comprising software code instructions for performing by a computer's processor the steps of the method according to the first aspect when said product is run on the computer.

In a third aspect, the invention also relates to said server B comprising said processor 401 and said interface 403 configured to perform the steps of the method according to the first aspect, said memory 402 configured to store said server device private key, said server value pvB, and said server dynamic offset hB.

In a fourth aspect the invention also relates to a system 100 comprising said server device B and said client device A.

Such a solution enables to perform SMC signature process based on RSA scheme, protected against device cloning attacks using the floating exponent technique and to recover synchronization between the client device and the server device when their desynchronization is lower than the maximum tolerance to desynchronization of the server device. It also keeps protecting against device cloning attacks by suspending the signature generation for larger desynchronization.

The invention claimed is:

1. A method for securing generation by a client device (A) and a server device (B) of an RSA (Rivest-Shamir-Adleman) signature (H(M)^d) of a message to be signed (M) with a private exponent component d of an RSA key (p, q, N, d, e) against cloning attacks, where e is a public exponent component, N is a RSA modulus, p, q primes such N=p.q and e.d =1 modulo phi(N) with phi(N) Euler's function, wherein said client device (A) stores a client device private key equal to (N, dA) with dA a client device private exponent component, a client value (pvA), and a client dynamic offset (hA), and wherein said server device (B) stores a server device private key equal to (N, dB) with dB a server device private exponent component, where dB=d−dA modulo phi(N), a server value (pvB), a server dynamic offset (hB) and a failure counter, said method comprising the following steps performed by the server device (B):

a. receiving from the client device a client part of said RSA signature (HS1) of said message to be signed (M) generated by the client device (A), after incrementing its client value (pvA) by a first predetermined step (E), from the client device private exponent component (dA), and from an updated client dynamic offset (hA'), said updated client dynamic offset (hA') being function of said client dynamic offset (hA) and of a client shift value (cA), said client shift value (cA) being function of said client value (pvA), b. setting said failure counter to a first default value, c. incrementing said server value (pvB) by a second predetermined step (E'), d. generating a server part of said RSA signature (HS2) of said message to be signed (M), from the server device private exponent component (dB), and from an updated server dynamic offset (hB'), said updated server dynamic offset (hB') being function of said server dynamic offset (hB) and of a server shift value (cB), said server shift value (cB) being function of said server value (pvB), e. generating said RSA signature by combining said client part of said RSA signature (HS1) and said server part of said RSA signature (HS2), f. checking if the generation of the RSA signature was a failure or a success and when it was a failure, incrementing said failure counter, g. when the generation of the RSA signature was a failure, iteratively repeating above steps c\ to f\, until said RSA signature of said message to be signed M is successfully generated or said failure counter reaches a first predetermined threshold thereby preventing cloning attacks based on repetition of RSA signature generation steps.

2. The method of claim 1, wherein said server device stores a ratification counter and a server initial value, said client device private key being protected by a client password, said client part of said RSA signature (HS1) being generated by the client device after a user of the client device provided a password value and :

step a\ comprises setting said server initial value equal to said server value (pvB), step g\ comprises when the generation of the RSA signature was a success, setting said ratification counter to a second default value, step g\ comprises when said failure counter reaches said first predetermined threshold, setting said server value equal to said server initial value, incrementing said server value by said second predetermined step and incrementing said ratification counter, and said method comprises the following step:

h. when said failure counter reaches said first predetermined threshold, iteratively repeating above steps a\ to g\ until said RSA signature of said message to be signed M is successfully generated or said ratification counter reaches a second predetermined threshold.

3. The method of claim 1, wherein the client device private exponent component dA or the server device private exponent component dB is a random integer in ]0; phi(N)[.

4. The method of claim 1, wherein said client shift value (cA) is generated by a pseudo random number generator from a secret value (seed_offset) preshared between the client device (A) and the server device (B) and from the client value (pvA), and said server shift value (cB) is generated by a pseudo random number generator from said secret value (seed_offset) and from the server value (pvB).

5. The method of claim 1, wherein said updated client dynamic offset (hA') is equal to the sum of the client dynamic offset (hA) and the client shift value (cA), and wherein said updated server dynamic offset (hB') is equal to the sum of the server dynamic offset (hB) and the server shift value (cB).

6. The method of claim 1, wherein said client part of the current RSA signature (HS1) is generated by the client device (A) using as signing key the sum of the client device private exponent component (dA) and the updated client dynamic offset (hA').

7. The method of claim 1, wherein said server part of the current RSA signature (HS2) is generated by the server device (B) using as signing key the result of subtracting the updated server dynamic offset (hB') from the server device private exponent component (dB).

8. The method of claim 1, wherein said client part of the current RSA signature (HS1) is generated by the client device (A) using as signing key the result of subtracting the updated client dynamic offset (hA') from the client device private exponent component (dA) and said server part of the current RSA signature (HS2) is generated by the server device (B) using as signing key the sum of the updated server dynamic offset (hB') and the server device private exponent component (dB).

9. The method of claim 1, wherein the client part of the current RSA signature HS1 of a message to be signed M is equal to $H(M)^{dA+hA'}$ mod n, the server part of the current RSA signature HS2 of said message to be signed M is equal to $H(M)^{dB-hB'}$ mod n, and the current RSA signature of said message to be signed M is equal to HS1*HS2 mod n, with H(M) a hashing of said message to be signed M.

10. The method of claim 1, wherein said first predetermined step (E) and said second predetermined step (E') are equal positive values.

11. The method of claim 1, wherein said first predetermined step (E) is a positive value, said second predetermined step (E') is equal to said first predetermined step (E) at the first execution of step c and said second predetermined step (E') is the opposite of said first predetermined step (E) at subsequent executions of step c during step g.

12. The method of claim 1, comprising receiving a PIN (Personal Identification Number) from the client device (A) in order to authenticate a user of the client device (A) and:
when said PIN is correct, increasing said first predetermined threshold,
when said PIN is incorrect, suspending said performing said method.

13. A computer program product comprising a memory having software code instructions stored thereon, the software code instructions, when executed by a computer processor, perform a method for securing generation by a client device (A) and a server device (B) of an RSA (Rivest-Shamir-Adleman) signature $(H(M)^d)$ of a message to be signed (M) with a private exponent component d of an RSA key (p, q, N, d, e) against cloning attacks, where e is a public exponent component, N is a RSA modulus, p, q primes such N=p.q and e.d=1 modulo phi(N) with phi(N) Euler's function,
wherein said client device (A) stores a client device private key equal to (N, dA) with dA a client device private exponent component, a client value (pvA), and a client dynamic offset (hA),
and wherein said server device (B) stores a server device private key equal to (N, dB) with dB a server device private exponent component, where dB=d−dA modulo phi(N), a server value (pvB), a server dynamic offset (hB) and a failure counter,
said method includes steps performed by the server device (B):
a. receiving from the client device a client part of said RSA signature (HS1) of said message to be signed (M) generated by the client device (A), after incrementing its client value (pvA) by a first predetermined step (E), from the client device private exponent component (dA), and from an updated client dynamic offset (hA'), said updated client dynamic offset (hA') being function of said client dynamic offset (hA) and of a client shift value (cA), said client shift value (cA) being function of said client value (pvA),
b. setting said failure counter to a first default value,
c. incrementing said server value (pvB) by a second predetermined step (E'),
d. generating a server part of said RSA signature (HS2) of said message to be signed (M), from the server device private exponent component (dB), and from an updated server dynamic offset (hB'), said updated server dynamic offset (hB') being function of said server dynamic offset (hB) and of a server shift value (cB), said server shift value (cB) being function of said server value (pvB),
e. generating said RSA signature by combining said client part of said RSA signature (HS1) and said server part of said RSA signature (HS2),
f. checking if the generation of the RSA signature was a failure or a success and when it was a failure, incrementing said failure counter,
g. when the generation of the RSA signature was a failure, iteratively repeating above steps c\ to f\, until said RSA signature of said message to be signed M is successfully generated or said failure counter reaches a first predetermined threshold thereby preventing cloning attacks based on repetition of RSA signature generation steps.

14. A system (100) comprising a server (B) and a client device (A) cooperating to perform a method for securing generation by a client device (A) and a server device (B) of an RSA (Rivest-Shamir-Adleman) signature $(H(M)^d)$ of a message to be signed (M) with a private exponent component d of an RSA key (p, q, N, d, e) against cloning attacks, where e is a public exponent component, N is a RSA modulus, p, q primes such N=p.q and e.d=1 modulo phi(N) with phi(N) Euler's function,
wherein said client device (A) stores a client device private key equal to (N, dA) with dA a client device private exponent component, a client value (pvA), and a client dynamic offset (hA),
and wherein said server device (B) stores a server device private key equal to (N, dB) with dB a server device private exponent component, where dB =d−dA modulo phi(N), a server value (pvB), a server dynamic offset (hB) and a failure counter, said method comprising the following steps performed by the server device (B):

receiving from the client device a client part of said RSA signature (HS1) of said message to be signed (M) generated by the client device (A), after incrementing its client value (pvA) by a first predetermined step (E), from the client device private exponent component (dA), and from an updated client dynamic offset (hA'), said updated client dynamic offset (hA') being function of said client dynamic offset (hA) and of a client shift value (cA), said client shift value (cA) being function of said client value (pvA), setting said failure counter to a first default value, incrementing said server value (pvB) by a second predetermined step (E'), generating a server part of said RSA signature (HS2) of said message to be signed (M), from the server device private exponent component (dB), and from an updated server dynamic offset (hB'), said updated server dynamic offset (hB') being function of said server dynamic offset (hB) and of a server shift value (cB), said server shift value (cB) being function of said server value (pvB), generating said RSA signature by combining said client part of said RSA signature (HS1) and said server part of said RSA signature (HS2), checking if the generation of the RSA signature was a failure or a success and when it was a failure, incrementing said failure counter, when the generation of the RSA signature was a failure, iteratively repeating above steps c\ to f\, until said RSA signature of said message to be signed M is successfully generated or said failure counter reaches a first predetermined threshold thereby preventing cloning attacks based on repetition of RSA signature generation steps.

* * * * *